United States Patent [19]

Hayakawa

[11] Patent Number: 4,693,416
[45] Date of Patent: Sep. 15, 1987

[54] DEFROSTER STRUCTURE FOR VEHICLE
[75] Inventor: Toshihiro Hayakawa, Toyota, Japan
[73] Assignee: Toyota Jidosha Kabushiki Kaisha, Japan
[21] Appl. No.: 873,523
[22] Filed: Jun. 12, 1986
[30] Foreign Application Priority Data
Jun. 14, 1985 [JP] Japan ............................ 60-90756[U]
[51] Int. Cl.⁴ ............................................ B60H 1/00
[52] U.S. Cl. ................................. 98/2.09; 237/12.3 A
[58] Field of Search ...................... 98/2.05, 2.09, 2.08; 237/12.3 R, 12.3 A

[56] References Cited
U.S. PATENT DOCUMENTS
4,105,246 8/1978 Trumbull ............................ 98/2.09
4,549,471 10/1985 Kochy et al. ........................ 98/2.09

Primary Examiner—Henry A. Bennet
Attorney, Agent, or Firm—Parkhurst & Oliff

[57] ABSTRACT

A defroster structure for a vehicle having a defroster member disposed in the vicinity of a cowl, and a nozzle opening of the defroster formed in the vicinity of a window shield of an instrument panel comprising an enclosed space surrounded by an inner wall and a tray-section-shaped defroster member under the inner wall in the vicinity of the window shield of the instrument panel, a plurality of fins integrally formed with the defroster member for forming the nozzle opening, said nozzle opening formed at the foremost position of the instrument panel in the vicinity of the window shield in the longitudinal direction of a vehicle. Thus, the drawbacks of the conventional defroster structure can be eliminated by providing a defroster nozzle opening at an instrument panel in the vicinity of a window shield.

5 Claims, 8 Drawing Figures

DEFROSTER STRUCTURE FOR VEHICLE

BACKGROUND OF THE INVENTION

The present invention relates to a defroster structure for a vehicle.

In a conventional defroster structure, as shown in FIGS. 5 to 7, a nozzle opening 12 of a defroster 5b is formed at the upper surface 42 of an instrument panel 4, the defroster 5b is formed of a split structure that a front defroster 50 and a rear defroster 51 are longitudinally bonded, and the defroster 5b is fastened by a screw B to a cowl bracket 18.

As the other conventional defroster structure shown in FIG. 8, in a defroster device in which a member for coupling a cowl reinforcement member 19 spot or arc welded to the cowl 1 with a front pillar is disposed, the defroster 5c is provided near the cowl reinforcement member 19, and the nozzle opening 12 of the defroster 5c is mounted near the window shield of the instrument panel 4, the indoor side wall 19a of the cowl reinforcement member 19 is surrounded by the defroster 5c to form an enclosed space 6, a defroster garnish 20 formed with the nozzle opening 12 is integrally formed within the defroster 5c, and the garnish 20 is mounted near the window shield 3 of the instrument panel 4.

In the conventional example shown in FIGS. 5 to 7, there are the following drawbacks and disadvantages;

(i) The nozzle opening 12 of the defroster 5b provided on the upper surface 42 of the instrument panel 4 attracts from the external appearance of the upper surface of the instrument panel.

(ii) The nozzle opening 12 of the defroster 5b reflects onto to the window shield 3 at the driving time to possibly disturb the driver's visual field.

(iii) In order to improve the external appearance of the nozzle opening 12 of the defroster 5b, parts for coating a garnish 21 increases in number, and the garnish 21 may thermally deform. Further, a large labor is consumed to align a gap 22 between the instrument panel 4 and a safety pad 4b or to precisely decide the size of the engaging portion 23 of the garnish 21, and the garnish 21 might be frequently removed from the instrument panel 4.

(iv) Since the defroster 5b is formed separately from the defroster 5b to increase the number of components, thereby increasing the cost and the weight.

(v) When the panel 4 is molded of resin, a thermal deformation occurs or a rigidity becomes insufficient due to high temperature of solar light via holes opened laterally by the nozzle opening 12.

SUMMARY OF THE INVENTION

Accordingly, an object of the present invention is to provide a defroster structure for a vehicle which eliminates the abovementioned drawbacks and disadvantages by providing a defroster nozzle opening at an instrument panel in the vicinity of a window shield.

More particularly, according to the present invention, there is provided a defroster structure for a vehicle having a defroster member provided in the vicinity of a cowl, and a nozzle opening of the defroster member mounted in the vicinity of a window shield of an instrument panel comprising an enclosed space formed by surrounding the panel body of the instrument panel in the vicinity of the window shield at the indoor side wall by a tray-section-shaped defroster member, a plurality of fins integrally formed with the tray-shaped defroster member for forming the nozzle opening to form the nozzle opening at the foremost position in the longitudinal direction of a vehicle of the instrument panel in the vicinity of the window shield.

According to the defroster structure of the invention described above, the indoor side wall of the panel body of the instrument panel in the vicinity of the window shield is formed with an enclosed space by surrounding the section integrally formed with a plurality of fins for forming the nozzle opening by the tray-shaped defroster member, and the nozzle opening of the defroster member is disposed on the instrument panel in the vicinity of the window shield.

These and other objects and features will become more apparent from the following description of the preferred embodiments of the present invention when read in connection with the accompanying drawings.

DESCRIPTION OF THE PREFERRED EMBODIMENTS

The embodiments of the present invention will be described in more detail with reference to the accompanying drawings.

Figure 1:
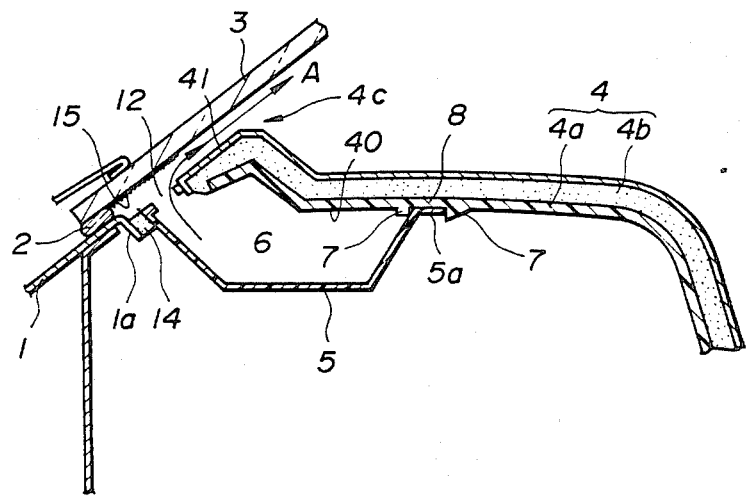
FIG. 1 is a sectional view of an embodiment of a defroster structure according to the present invention taken along the line I—I in FIG. 3.
Figure 2:
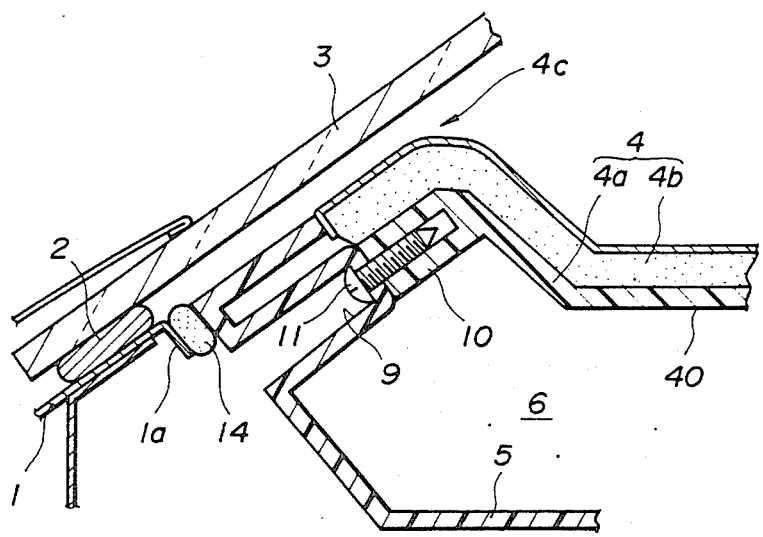
FIG. 2 is a sectional view taken along the line II—II in FIG. 3.
Figure 3:
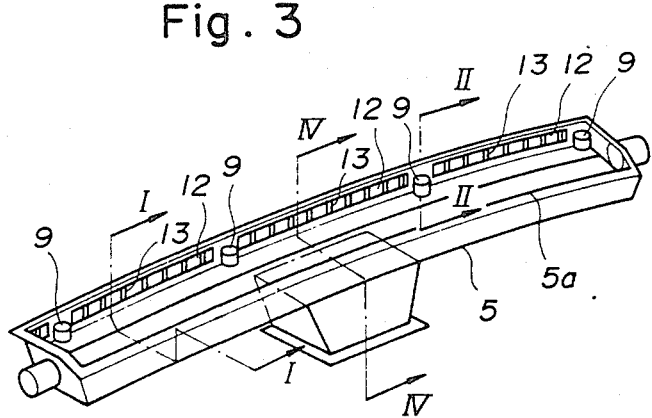
FIG. 3 is a perspective view of the tray-shaped defroster member of the embodiment of the invention.

FIGS. 1 to 4 show an embodiment of a defroster structure according to the present invention. As shown in FIGS. 1 and 2, a window shield 3 is bonded by a bonding agent 2 to a cowl 1, and one end 4c of an instrument panel 4 is mounted by fittings (not shown) near on the shield 3.

The instrument panel 4 is formed of a panel body 4a and a safety pad 4b. As understood from FIG. 1, an enclosed space 6 is formed of the inner wall 40 and a tray-section-shaped defroster member 5 under the inner wall 40 in the vicinity of the window shield 3 of the panel body 4a.

More specifically, the defroster member 5 is not longitudinally split, but the upper surface of the defroster member 5 is formed of part of the panel body 4a.

The defroster member 5 is mounted on the instrument panel 4 by engaging the flange 5a at the rear side of the defroster member 5 between positioning and air leakage preventing two projections 7 and 7 formed on the inner wall 40 of the panel body 4a and fastening the flange 5a at a plurality of positions by thermal fusion-bonding at 8 to the inner wall 40.

As understood from FIG. 2, a recess 9 is formed at the front side of the defroster member 5 in the longitudinal direction of a vehicle, and clamped by a screw 11 to a boss 10 formed at the longitudinal front end of the panel body 4a of the instrument panel 4.

Further, a plurality of fins 13 (FIG. 3) having approximately 2 mm of width for forming the nozzle opening 12 are integrally formed with the front end of the defroster member 5 in the vicinity of the recess 9 of the defroster member 5, and the nozzle opening 12 is formed at the foremost position 41 of the instrument panel 4 in the vicinity of the window shield in the longitudinal direction of the vehicle. In order to diffuse air along the window shield 3 as designated by an arrow A in FIG. 1 from the nozzle opening 12, a seal 14 is interposed between the lower surface of the front end of the defroster member 5 in the entire width and the flange 1a of the cowl 1 as shown in FIGS. 1 and 2 so that air does not leak except the window shiled 3.

As shown in FIG. 1, when paint 5 is coated on the window shield 3 opposed to the nozzle opening 12 inside the compartment, the nozzle opening 12 may be completely concealed.

Figure 4:
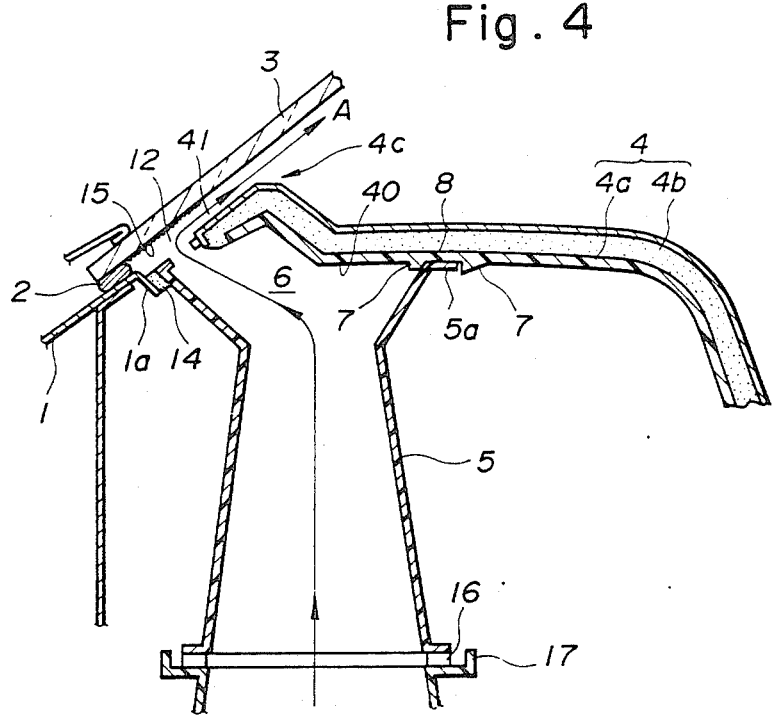
FIG. 4 is a sectional view taken along the line IV—IV in FIG. 3.
Figure 5:
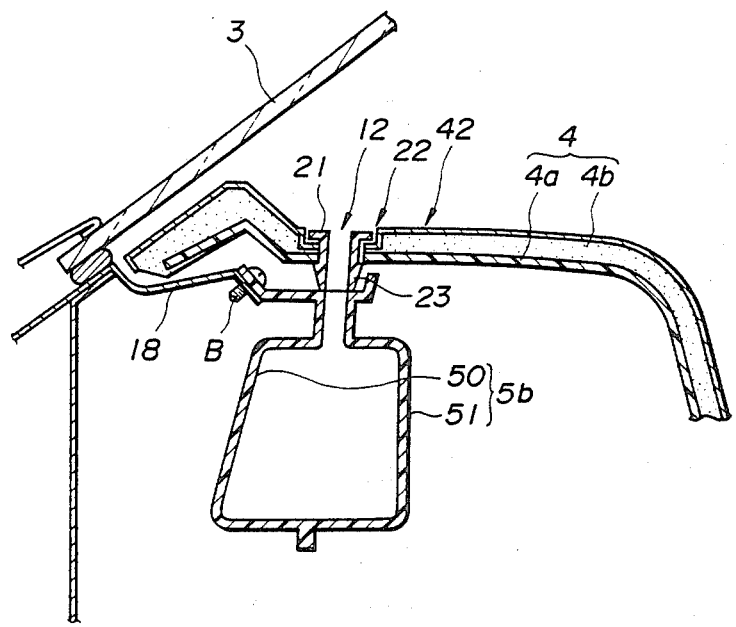
FIG. 5 is a sectional view of a conventional defroster structure takne along the ling V—V in FIG. 6.
Figure 6:
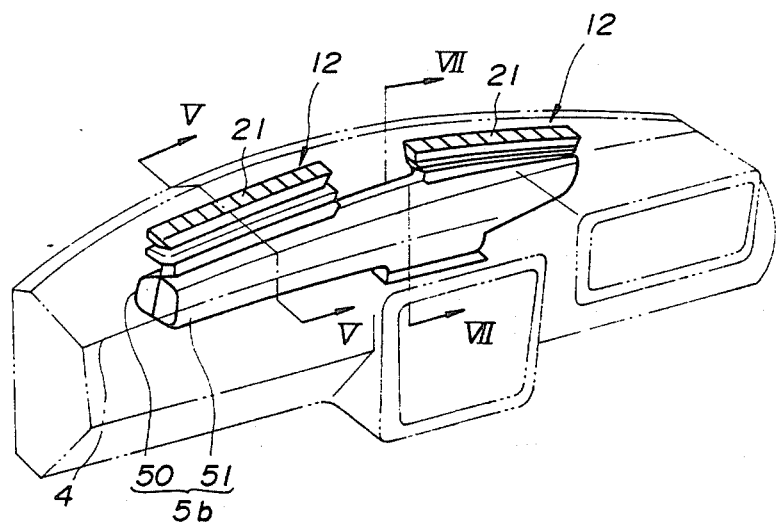
FIG. 6 is a perspective view of the conventional defroster structure.
Figure 7:
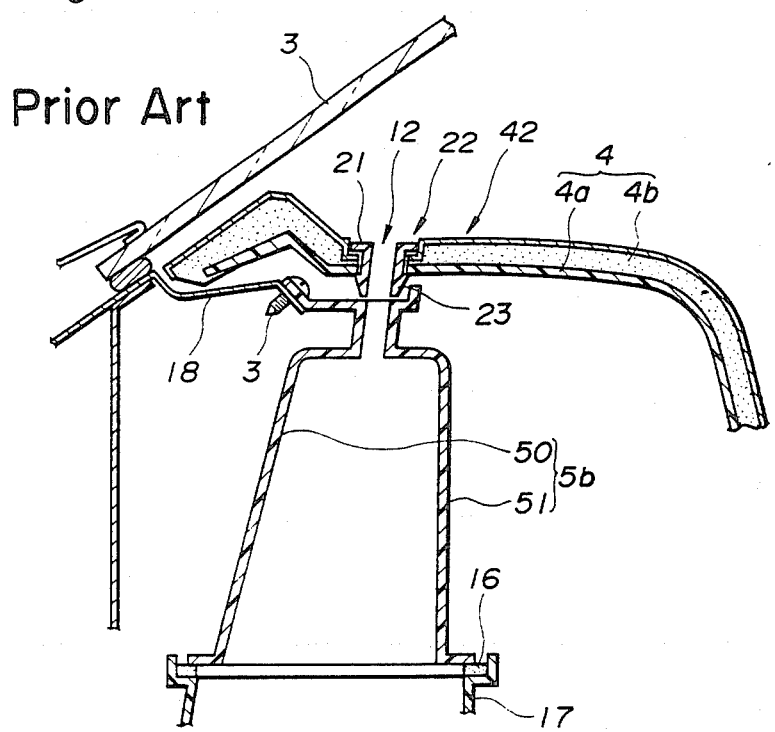
FIG. 7 is a sectional view taken along the line VII—VII in FIG. 6.
Figure 8:
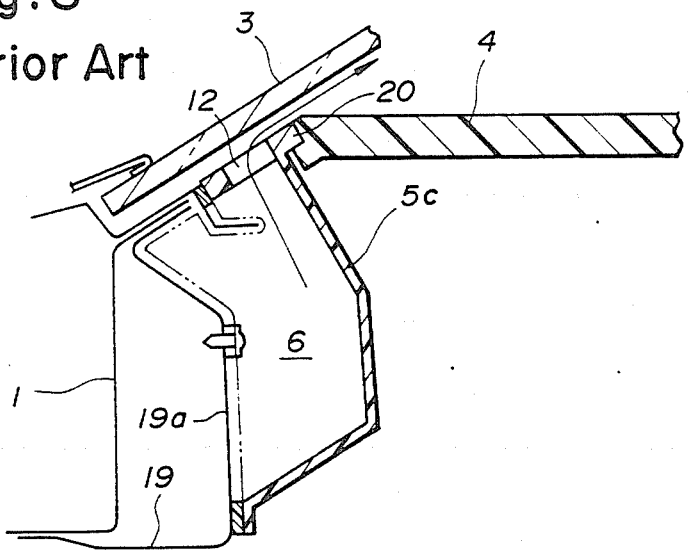
FIG. 8 is a sectional view of the other conventional defroster structure.

As further shown in FIG. 4, the lower central end of the defroster member 5 is coupled with a heater 17 through a seal 15 to flow air in the direction of an arrow A in FIG. 4.

According to the present invention as described above, the nozzle opening of the defroster member is provided at the instrument panel near the window shield to thereby increase the rigidity of the panel body of the instrument panel to eliminate thermal deformation, and to eliminate a garnish for the defroster member, thereby obviating the aligning work of the garnish to further eliminate the reflection of the window to thus improve the visual field and to hardly see the nozzle opening of the defroster member, thereby improving the external appearance and increasing the degree of freedom of design.

What is claimed is:

1. A defroster structure for a vehicle having a defroster member disposed in the vicinity of a cowl and a nozzle opening of the defroster formed in the vicinity of a window shield of an instrument panel comprising:
   an enclosed space surrounded by an inner wall of the instrument panel and a tray-shaped defroster member under the inner wall in the vicinity of the window shield; and
   a plurality of fins integrally formed with the defroster member for forming the nozzle opening, said nozzle opening formed at the foremost position of the instrument panel in the vicinity of the window shield in the longitudinal direction of a vehicle;
   wherein said nozzle opening provides the sole communication between said enclosed space and said window shield.

2. The defroster structure according to claim 1, wherein said defroster member includes a flange on the rear side thereof, said flange being engaged between two positioning and air leakage preventing projections formed on the inner wall of the instrument panel.

3. The defroster structure according to claim 1, wherein a recessed portion is formed on the front side of the defroster member in the longitudinal direction of the vehicle, said recessed portion being clamped by a screw to a boss formed at the front end of the instrument panel.

4. The defroster structure according to claim 1, wherein a seal is interposed between the lower surface of the front end of the defroster member and the flange of the cowl along the entire width of the front end of the defroster member.

5. The defroster structure according to claim 1, wherein a paint is coated on the window shield inside the compartment opposed to the nozzle opening.

* * * * *